(12) United States Patent
Haines et al.

(10) Patent No.: US 8,631,204 B2
(45) Date of Patent: Jan. 14, 2014

(54) MULTI-RESOLUTION CACHE MONITORING

(75) Inventors: Jonathan Williams Haines, Boulder, CO (US); Wayne Howard Vinson, Boulder, CO (US); Edwin Scott Olds, Fort Collins, CO (US); Timothy Richard Feldman, Louisville, CO (US); Steven S. Williams, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 604 days.

(21) Appl. No.: 12/836,296

(22) Filed: Jul. 14, 2010

(65) Prior Publication Data

US 2012/0017045 A1 Jan. 19, 2012

(51) Int. Cl.
*G06F 12/00* (2006.01)
(52) U.S. Cl.
USPC .................................. 711/118; 711/E12.017

(58) Field of Classification Search
USPC .......................................... 711/118, E12.017
See application file for complete search history.

(56) References Cited

U.S. PATENT DOCUMENTS

| | | | |
|---|---|---|---|
| 5,684,976 A * | 11/1997 | Soheili-Arasi et al. | 711/128 |
| 5,696,931 A | 12/1997 | Lum et al. | |
| 6,134,634 A | 10/2000 | Marshall, Jr. et al. | |
| 6,880,043 B1 | 4/2005 | Castro et al. | |

* cited by examiner

*Primary Examiner* — Larry Mackall
(74) *Attorney, Agent, or Firm* — Alan G. Rego; Westman, Champlin & Koehler, P.A.

(57) ABSTRACT

Multi-resolution cache monitoring devices and methods are provided. Multi-resolution cache devices illustratively have a cache memory, an interface, an information unit, and a processing unit. The interface receives a request for data that may be included in the cache memory. The information unit has state information for the cache memory. The state information is organized in a hierarchical structure. The process unit searches the hierarchical structure for the requested data.

18 Claims, 5 Drawing Sheets

MULTI-RESOLUTION CACHE MONITORING

BACKGROUND

Computing devices and other electronic devices commonly utilize a cache memory in combination with another type of memory. Use of a cache memory may help to improve data access and storage performance. For example, a mass storage device can respond to a data request from a host more quickly if it is able to locate the requested data in its cache, as opposed to having to retrieve the data from a magnetic medium, flash memory array, or another slower type of memory.

Cache memory systems may have a control system that monitors the state information of the cache memory. The state information can include an indication of the data currently stored in the cache and its corresponding physical location, for example. When a system that has such a cache control system receives a command from a host, it is able to check its state information to determine if the data related to the command is in its cache.

SUMMARY

An aspect of the disclosure relates to multi-resolution cache monitoring. Multi-resolution cache devices illustratively have a cache memory, an interface, an information unit, and a processing unit. The interface receives a request for data that may be included in the cache memory. The information unit has state information for the cache memory. The state information is organized in a hierarchical structure. The process unit searches the hierarchical structure for the requested data.

DETAILED DESCRIPTION

One or more embodiments of the present disclosure include systems and methods for multi-resolution monitoring of state information for cache memories. In systems having only a single level of resolution, it is common to have to check each entry in the one level to determine if data is in the cache. This may reduce system performance by requiring a high number of comparisons. In certain embodiments of the present disclosure, the number of comparisons required to determine if data is in cache may be reduced by implementing a multi-level approach to cache monitoring and searching. In one embodiment, data identifiers (e.g. logical block addresses) are grouped into ranges, and the ranges are checked before comparing any individual entries. For example, one range may have data corresponding to logical block addresses (LBAs) 0 to 999. If the cache system is checking to see if it has LBA 2000, it does not have to check all of the entries in the LBA 0 to 999 range. It will know by a single comparison operation that the entries within that range do not correspond to the desired data. Accordingly the number of comparisons and the corresponding search time are reduced in systems having multi-resolution cache monitoring. Before discussing further features of the present disclosure, it is worthwhile to first describe an illustrative operating environment.

Figure 1:
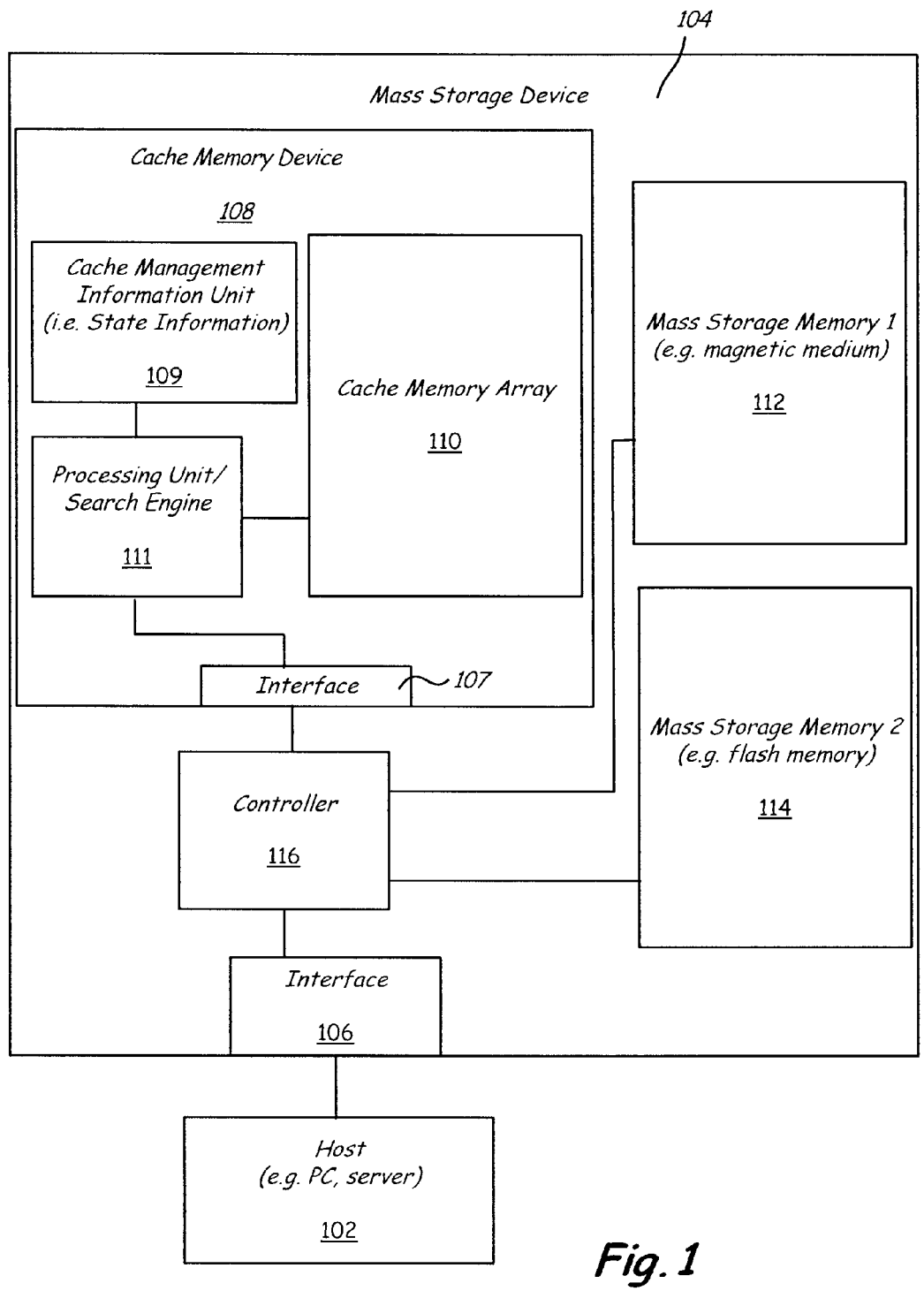
FIG. 1 is a schematic diagram of a host that is communicatively coupled to a mass storage device.

FIG. 1 is a schematic diagram of one illustrative environment in which certain embodiments may be incorporated in. Embodiments are not however limited to any particular environment and are illustratively incorporated in a wide variety of environments. For example, the system in FIG. 1 shows a cache memory device being utilized in the context of a mass storage device. Embodiments of the present disclosure are also implemented in other contexts such as, but not limited to, a CPU cache or an optical medium cache.

In FIG. 1, a host 102 is communicatively coupled to a mass storage device 104. Mass storage device 104 receives commands (e.g. read and write commands) from host 102 through an interface 106. Mass storage device 104 illustratively has multiple different types of memories. In the specific example shown in the figure, mass storage device 104 has a cache memory 108, a first mass storage memory 112, and a second mass storage memory 114. In an embodiment, first mass storage memory 112 includes a magnetic recording device (e.g. a HDD), and second mass storage memory 114 includes a flash memory device (e.g. a SSD). Embodiments are not however limited to any particular configuration or types of memory devices.

A controller 116 illustratively utilizes cache memory 108 in improving data retrieval and storage performance. For instance, mass storage device 104 may be able to respond more quickly to a command from host 102 if it is able to identify and retrieve data from its cache memory 108, as opposed to having to retrieve the same data from either mass storage memory 112 or mass storage memory 114. Cache memory 108 is optionally implemented as a non-volatile memory (e.g. flash or battery backed DRAM) such that data is not lost if mass storage device 104 loses power. Cache memory 108 is not however limited to any particular type of memory and may be implemented in other types of memories such as a volatile memory.

Cache memory 108 has an interface 107, a cache management information unit 109, a cache memory array 110, and a processing unit/search engine 111. Cache memory array 110 illustratively has cached data that may correspond to data contained in either mass storage memories 112 or 114. For example, for illustration purposes only and not by limitation, cache memory array 110 could have data that corresponds to LBA 50-90 from mass storage memory 112 and data that corresponds to LBA 2000-2200 from mass storage memory 114. The information about what data is in cache memory array 110 and the locations of the data are illustratively included within cache management information unit 109. Unit 109 maintains or monitors state information for cache memory array 110. Additionally, in one embodiment, state information may be included not only within unit 109 of the cache memory device 108, but may also be included another memory such as, but not limited to, a mass storage device (e.g. mass storage memories 112 and 114).

Figure 2:
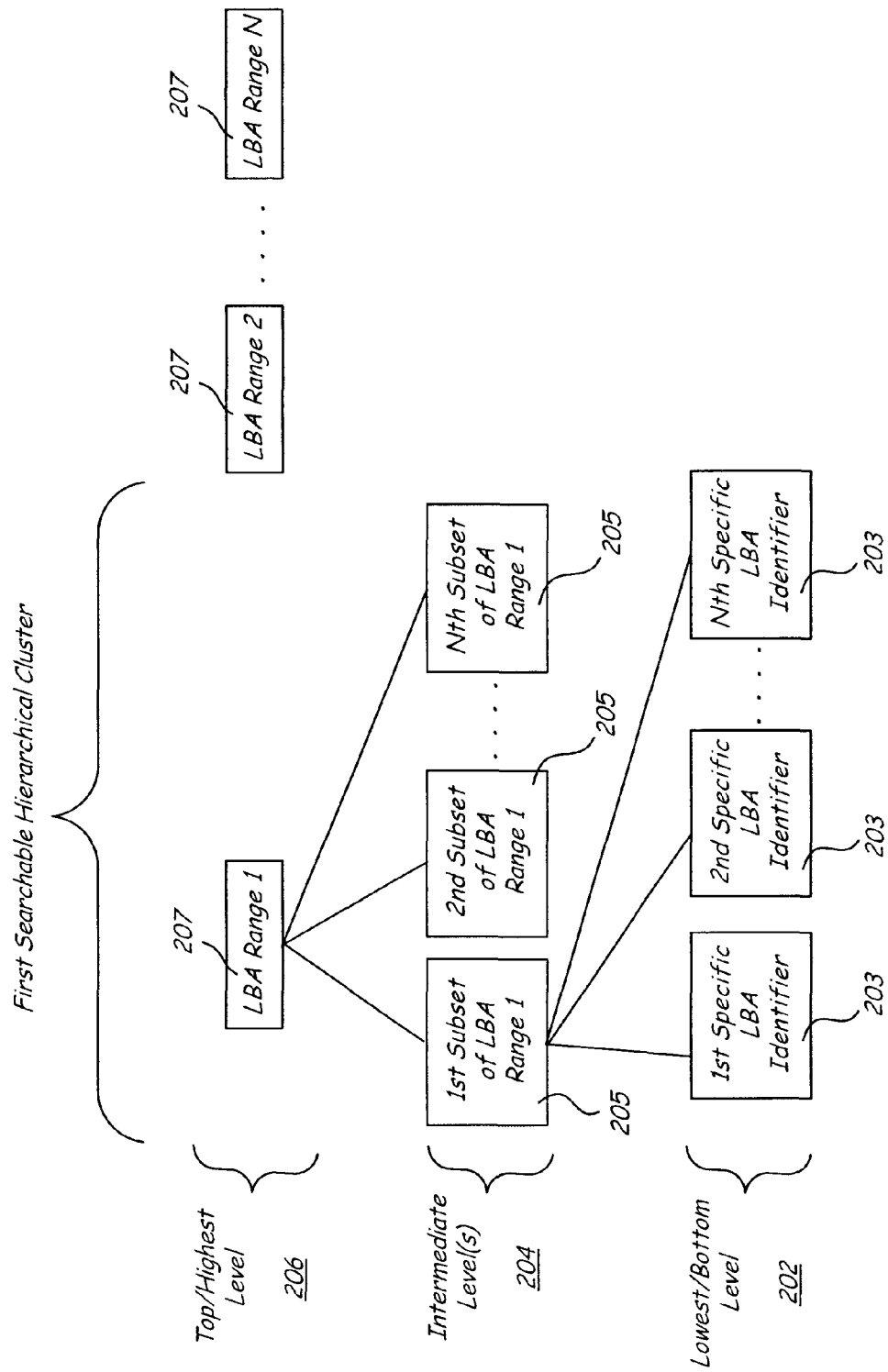
FIG. 2 is a schematic diagram of a hierarchical structure for the state information of a cache memory device.

FIG. 2 is a schematic diagram of an organization or structure of the state information for cache memory 108. At the bottom or lowest level 202 of the hierarchy are entries or identifiers 203 that represent specific LBAs or specific contiguous LBA ranges included within cache memory array 110. At the top or highest level 206 of the hierarchy are entries or identifiers 207 that represent groups or ranges of LBAs. For instance, for illustration purposes only and not by limitation, one identifier 207 could be LBA 0-999, and all of the lowest level entries 203 beneath the identifier would be specific LBAs or specific contiguous LBA ranges that fall within the range of LBA 0-999 (e.g. LBA 10, LBA 200, LBA 330-350, etc).

The state information hierarchy may also include one or more intermediary levels 204. In an illustrative example, each intermediary level 204 includes entries or identifies 205 that identify a range that is a subset of the range of the level immediately above it in the hierarchy. To give a specific example for illustration purposes, if an identifier 207 at the highest level 206 corresponds to LBA 1000-1999, it may have identifiers 205 at a lower intermediary level 204 corresponding to LBA 1000-1499 and LBA 1500-1999. It is worth noting that embodiments of the present disclosure are not limited to having any particular number of entries at any particular level or any particular number of levels. For instance, a higher level identifier 207 could have only two lower identifiers 205 or could have twenty lower identifiers 205. It is also worth noting that each identifier 207 and its corresponding lower level identifiers illustratively form a cluster. Embodiments include any number of clusters and the clusters can be formed utilizing any clustering technique.

Figure 3:
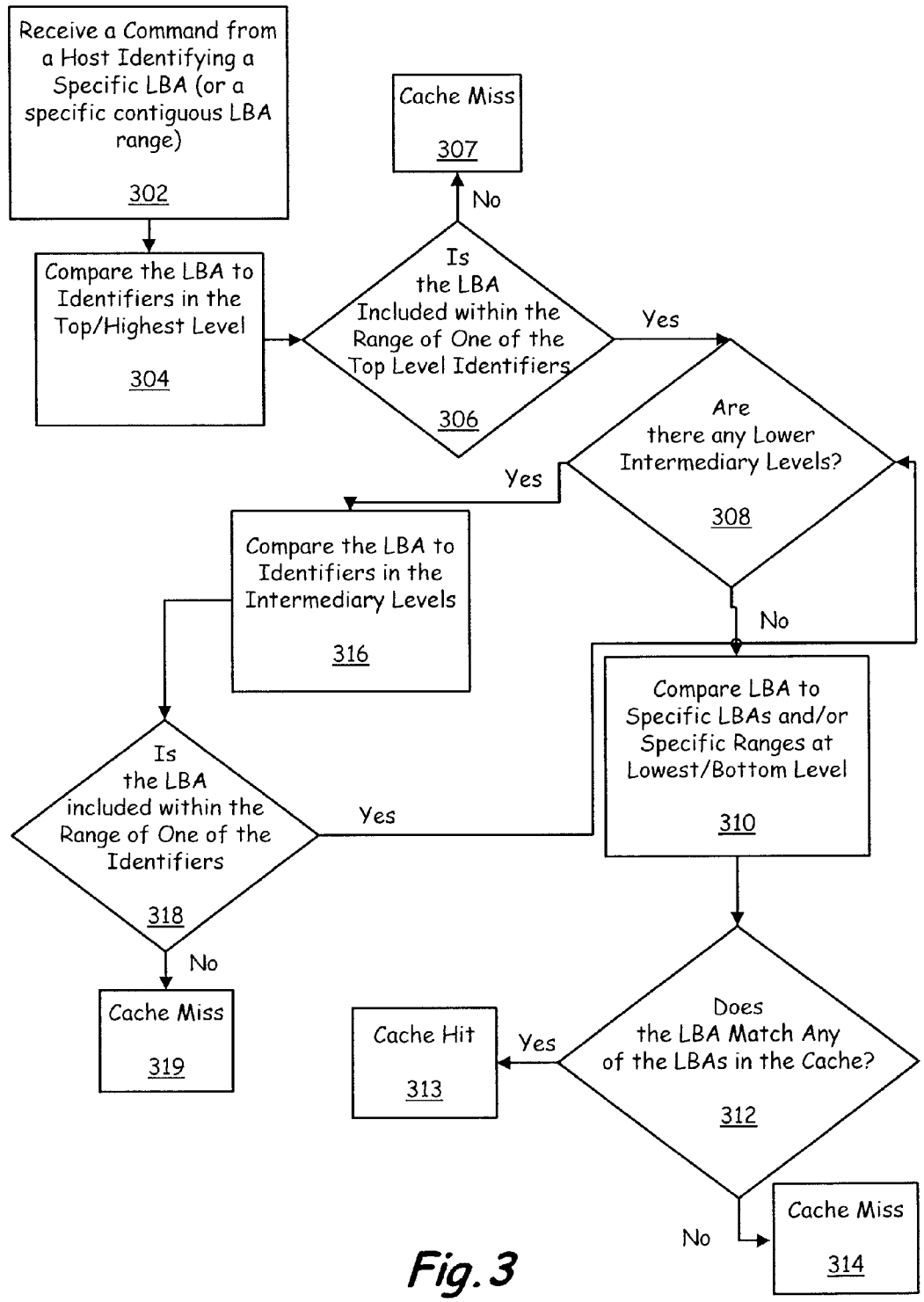
FIG. 3 is a flowchart of a method of checking a cache memory having a hierarchical state information structure.

FIG. 3 is a flowchart illustrating a method of checking a cache memory that has a hierarchical structure such as that shown in FIG. 2. At block 302, a cache memory receives a command from a host. The command identifies a specific LBA or a specific contiguous LBA range. At block 304, the cache memory compares the specific LBA or the LBA range to the entries or identifiers in the top or highest level of the hierarchy. Comparisons within the method such as that at block 304 are illustratively performed by one or more hardware search engines. Embodiments are not however limited to any particular implementation. If there is no overlap between the LBA from the command and any of the ranges in the in the top level, that means that none of the desired data is in the cache's memory. Accordingly, the cache search is completed/terminated at block 307 with a "cache miss."

Before continuing on, it is worth highlighting a feature of the system described above. In the example described above, the cache memory does not need to compare the desired LBA to every specific LBA included within its cache. Instead, it compares the desired LBA only to ranges representing the specific LBAs. This may help to improve cache performance by reducing the amount of searching/comparison time spent in cases that end in cache misses.

If there is some overlap (partial or complete) between the desired LBA or LBA range and the ranges specified by the top level identifiers, then this means that some or all of the desired data may be in the cache. The system then goes on at block 308 to determine if there are any lower intermediary levels (e.g. levels 204 in FIG. 2). If there are no intermediary levels, then that means that the next level is the bottom or lowest level that includes the entries or identifiers that represent specific LBAs or specific contiguous LBA ranges included within the cache memory array. In that case, the system goes to block 310 and compares the desired LBA to the specific LBAs included within the cluster. It is important to note that this comparison does not include all of the specific LBAs or LBA ranges that are included within the cache, for example. Instead, the comparison only involves comparing to the LBAs included within the one cluster. This again may improve cache performance by reducing the amount of time, processing power, energy, etc. spent on searching a cache, for example.

At block 312, if there is some overlap (again partial or complete) between the desired LBA and the LBAs included in the lowest or bottom level of the hierarchy, this means that at least some of the desired data is in the cache. The system will be able to retrieve the corresponding data from the cache. This may improve performance of a device by reducing the amount of data that needs to be retrieved from a potentially slower memory. At least some of the desired data being in the cache is represented by a "cache hit" at block 313. If there is no overlap between the desired LBA and the LBAs in the bottom level, then the cache does not included any of the desired data which is represented by a "cache miss" at block 314.

Returning now to block 308, if there are one or more intermediary levels, the system goes on to block 316 and compares the desired LBA to the LBA ranges specified by the identifiers or entries in the intermediary levels. At block 318, if there is no overlap, this means that none of the desired data is in the cache and the cache search terminates at block 319 with a "cache miss." In this situation, again no specific LBAs included within the cache needed to be compared. This may improve system performance by identifying cache misses more quickly and/or requiring fewer resources to do so, for example. If there is at least some overlap, that means that some of the desired data may be in the cache. The system then continues on to block 308 which has been previously described. The process essentially repeats itself and digs down through the hierarchy of ranges (e.g. levels 206 and 204) until it gets to specific LBAs to compare the desired LBA to.

Figure 4:
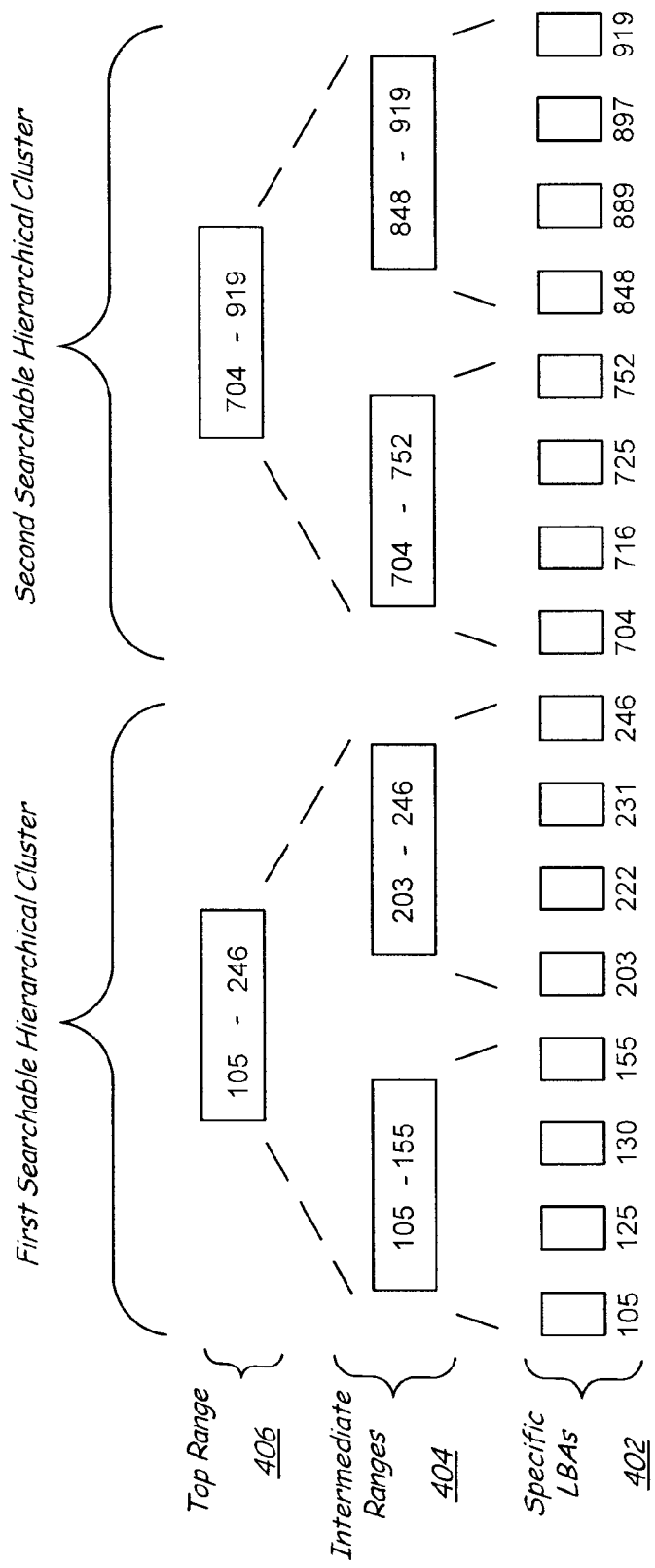
FIG. 4 is a schematic diagram of one example of a hierarchical state information structure.

FIG. 4 is a schematic diagram showing one specific example of an organization of state information for a cache memory. The example is being given to further illustrate the principles discussed above. The state information in the figure is organized into two searchable hierarchical clusters. The first cluster has a top level range 406 that has an entry or identifier corresponding to an LBA range of 105-246. Beneath that top level are two intermediary level 404 sub-ranges. The first sub-range represents LBAs 105-155 and the second sub-range represents LBAs 203-246. Beneath the sub-ranges are identifiers or entries that represent individual LBAs of data included in a cache memory. Beneath the first sub-range of the first cluster are LBAs 105, 125, 130, and 155. Beneath the second sub-range of the first cluster are LBAs 203, 222, 231, and 246. The second cluster in FIG. 4 is shown as being arranged in a like fashion.

The state information in FIG. 4 is illustratively searchable in a manner consistent with the method described in relation to FIG. 3. For instance, if a cache system receives a command for LBA 231, the system checks the top level range identifiers 406 until it finds a match or determines that there is not a match. For LBA 231, the system would determine that there is a match with the first cluster (i.e. the cluster with top level LBA identifier 105-246). The system would then check the sub-ranges 404 within the matching top level. For LBA 231, the system would determine that there is a match with the second sub-range (i.e. the sub-range corresponding to LBA range 203-246). Based upon that match, the system would then check the specific LBA identifiers at the bottom level 402. In this case, the system would find that LBA 231 is in the bottom level 402 and that there is therefore a cache hit in this situation.

The precise method of forming clusters is not limited to any specific method and illustratively includes any method of forming clusters. In one method, such as that shown in FIG. 4, the specific LBAs in the lowest level are illustratively arranged or ordered in a sequential fashion (e.g. in an increasing or decreasing order) and are then grouped. In one embodiment, the intermediary levels or ranges 404 and the top levels or ranges 406 are then formed such that there are approximately the same number of LBAs in each intermediary level and top level. For instance, in FIG. 4, there are two clusters/top levels, four intermediary levels, and sixteen specific LBAs. Accordingly, the clusters are formed by putting four specific LBAs in each intermediary level (i.e. 16 LBAs/4 intermediary levels=4 LBAs/intermediary level), and two intermediary levels into each cluster (i.e. 4 intermediary levels/2 clusters=2 intermediary levels/cluster).

The example further shows that the range identifiers at the top level 406 identify the lowest numbered LBA in the cluster and the highest numbered LBA in the cluster, and that the range identifiers at the intermediate ranges 404 identify the lowest numbered LBA in the sub-range and the highest numbered LBA in the sub-range. Other methods of forming clusters include, for example, k-means clustering, joining clustering, tree clustering, two-way joining clustering, block clustering, vertical icicle plots, expectation maximization clustering, and a horizontal hierarchical tree plot.

The number of clusters within a state information hierarchy may either be fixed or variable. In variable cases, new clusters can simply be added as additional data is transferred to the cache. In fixed cases, it may be necessary to remove an existing cluster before adding a new cluster. One illustrative method includes removing the oldest cluster (i.e. the least recently used cluster) from the hierarchy when a new cluster needs to be formed. Another method includes joining two or more existing clusters to form a single cluster when cluster capacity/space is needed. Joining clusters illustratively includes measuring or determining the distance between each of the clusters in a hierarchy and then joining the two or more clusters that are closest together.

The same measuring of distances is also optionally used to decide whether to split a single cluster into two clusters. This may be needed or desirable when balancing or re-balancing a hierarchy (e.g. to determine what the clusters should be after data has been removed from or added to cache). Some examples of types of distances that are included in embodiments are, for illustration purposes only and not by limitation, Euclidean distances, squared Euclidean distances, city-block or Manhattan distances, Chebychev distances, power distances, and percent disagreement. Further, some illustrative amalgamation or linkage rules include single linkage/nearest neighbor, complete linkage/furthest neighbor, unweighted pair-group average, weighted pair-group average, unweighted pair-group centroid, weighted pair-group centroid/median, and Ward's method.

Figure 5:
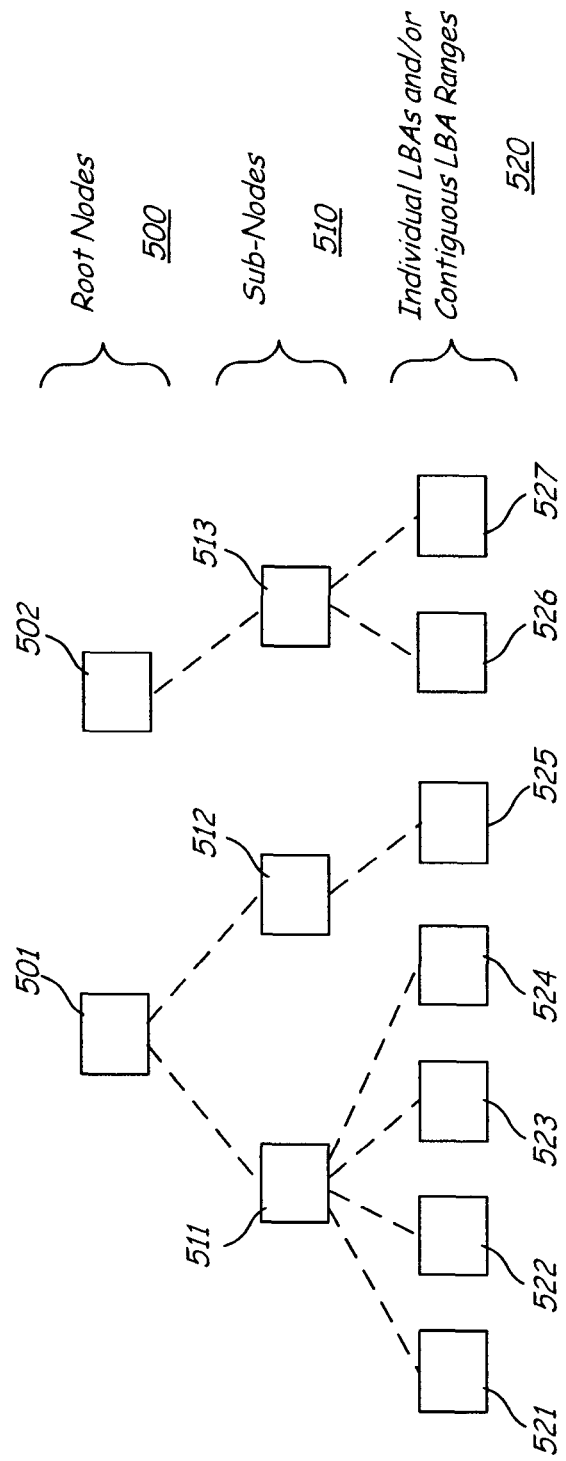
FIG. 5 is a schematic diagram of an unbalanced hierarchical state information structure.

FIG. 5 is a simplified schematic diagram of another example of an organization of state information for a cache memory. In the example shown in FIG. 4, the structure is balanced in that for each level there are the same number of sub-nodes under each node (e.g. there are two sub-nodes at intermediate ranges 404 for each node at the top ranges 406). Embodiments according to the present disclosure include both balanced and unbalanced organizations. FIG. 5 is an illustration of an unbalanced organization.

The structure in FIG. 5 has three levels, a root node level 500, an intermediary sub-node level 510, and an individual LBA or contiguous range of LBAs level 520. As has been previously mentioned, embodiments illustratively include any number of different levels. The figure shows that for nodes at one level there may be an unequal number of sub-nodes at the lower level. For example, under node 501 at level 500 there are two sub-nodes 511 and 512, but under node 502 also at level 500 there is only one sub-node 513. Also for example, under node 511 at level 510 there are four sub-nodes 521, 522, 523, and 524, but under node 512 also at level 510 there is only one sub-node 525.

As will be appreciated by those skilled in the art, the amount of time and/or system resources needed to find an LBA or LBA range will depend upon the organization of the structure and their positions within the structure. For instance, to locate the block labeled 524 in FIG. 5, comparisons may need to be performed against two nodes at level 510 (i.e. nodes 511 and 512) and against four nodes at level 520 (i.e. nodes 521, 522, 523, and 524). However, to locate the block labeled 527 in FIG. 5, comparisons may only need to be performed against one node at level 510 (i.e. node 513) and two nodes at level 520 (i.e. nodes 526 and 527).

In an embodiment, organizations are balanced or are re-balanced based upon temporal and/or density considerations. For instance, an LBA or LBA range that corresponds to data that has been more recently accessed or more recently written may be positioned within a structure such that relatively fewer comparisons are needed to locate the LBA or LBA range (e.g. it could be positioned at a location like block 526 in FIG. 5 instead of at a location like block 524 in FIG. 5). Similarly, LBAs or LBA ranges that have not been accessed or written recently may be positioned such that it takes relatively more comparison to locate the LBAs or LBA ranges. In these situations, the performance of a system may be improved by reducing the amount of time and/or resources needed to find data that is more likely to be retrieved from the cache.

As has been described above, one or more embodiments of the present disclosure illustratively provide cache systems and methods that may improve performance of memory systems. For instance, fewer comparison operations may be needed to identify a cache hit or a cache miss. This is due in part to the use of a hierarchical organizational structure that utilizes comparisons to ranges of LBAs. Additionally, because of the improved performance and hierarchical structure, systems may be able to, in at least certain embodiments, maintain more state information than they could otherwise. For example, in systems that do not have a hierarchical structure (e.g., they are flat), it may be desirable from a performance perspective to maintain state information for only a relatively small portion of the data included within the cache. Consequently, one or more embodiments of the present disclosure may also improve performance by enabling more data to be retrieved from a quicker cache memory, as opposed to having to be retrieved from a slower memory such as, but not limited to, a hard disc drive.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to data storage systems, it will be appreciated by those skilled in the art that the teachings of the disclosure can be applied to other types of electronic devices, without departing from the scope and spirit of the disclosure.

What is claimed is:
1. A device comprising:
   an interface configured to receive a request for data that may be included in a cache memory;
   an information unit that has state information for the cache memory, the state information being organized in a hierarchical structure that includes a top level and a lower level, each of the top level and the lower level having identifiers that specify ranges of data addresses; and a processing unit that searches the hierarchical structure for the data, wherein the state information is balanced based at least in part upon a temporal factor that includes positioning a first range of the ranges of data addresses, which correspond to data that is more likely to be accessed from the cache memory, at a first location in the multiple searchable levels and positioning a second range of the ranges of data addresses, which correspond to data that is less likely to be accessed from the cache memory, at a second location in the multiple searchable levels, the first location requiring fewer comparisons to locate than the second location.

2. The device of claim 1, wherein the identifiers that specify ranges of data addresses comprise logical block addresses.

3. The device of claim 2, wherein the processing unit returns a cache miss upon the data not being within any of the ranges of data addresses specified by the top level identifiers.

4. The device of claim 2, wherein the processing unit searches the lower level upon the data being within one of the ranges of data addresses specified by the top level identifiers.

5. The device of claim 4, wherein the ranges of data addresses specified by the lower level identifiers are sub-sets of the ranges of data addresses specified by the top level identifiers.

6. The device of claim 5, wherein the processing unit returns a cache miss upon the data not being within any of the ranges of data addresses specified by the lower level identifiers.

7. The device of claim 4, where the lower level identifiers either specify a specific data address or a specific contiguous range of data addresses.

8. A device comprising:
cache memory; and
state information about the cache memory, the state information including multiple searchable levels,
wherein at least one of the multiple searchable levels includes range identifiers that specify ranges of data addresses, and
wherein each of the ranges of data address is bounded by two of the range identifiers, and
wherein the state information is balanced based at least in part upon a temporal factor that includes positioning a first range of the ranges of data addresses, which correspond to data that is more likely to be accessed from the cache memory, at a first location in the multiple searchable levels and positioning a second range of the ranges of data addresses, which correspond to data that is less likely to be accessed from the cache memory, at a second location in the multiple searchable levels, the first location requiring fewer comparisons to locate than the second location.

9. The device of claim 8, wherein the range identifiers comprise logical block addresses.

10. The device of claim 8, wherein the state information is balanced based at least in part upon a density factor.

11. The device of claim 8, further comprising:
a hardware search engine that searches the state information.

12. The device of claim 8, wherein the multiple searchable levels include a top level, a bottom level, and one or more intermediary levels.

13. A method comprising:
providing a cache memory;
providing state information about the cache memory, the state information including multiple searchable levels the include a plurality of data address ranges, wherein the state information is balanced based at least in part upon a temporal factor that includes positioning a first range of the plurality of data addresses ranges, which correspond to data that is more likely to be accessed from the cache memory, at a first location in the multiple searchable levels and positioning a second of the plurality of data addresses ranges, which correspond to data that is less likely to be accessed from the cache memory, at a second location in the multiple searchable levels, the first location requiring fewer comparisons to locate than the second location;
receiving a request for data, the data corresponding to at least one data address; and
comparing with a processing unit the at least one data address to the plurality of data address ranges.

14. The method of claim 13, further comprising:
returning a cache miss upon a determination that the at least one data address is not within any of the plurality of data address ranges.

15. The method of claim 13, further comprising:
comparing the at least one data address to a plurality of data address identifiers upon a determination that the at least one data address is within one of the plurality of data address ranges.

16. The method of claim 15, further comprising:
returning a cache hit upon the at least one data address matching one of the plurality of data address identifiers.

17. The method of claim 15, further comprising:
returning a cache miss upon the at least one data address not matching any of the plurality of data address identifiers.

18. The method of claim 13, further comprising:
comparing the at least one data address to a second plurality of data address ranges upon a determination that the at least one data address is within one of the plurality of data address ranges.

* * * * *